United States Patent

[11] 3,571,716

[72] Inventors Fred P. Hill
Elgin;
Richard T. Race, Chicago, Ill.
[21] Appl. No. 721,716
[22] Filed Apr. 16, 1968
[45] Patented Mar. 23, 1971
[73] Assignee Motorola, Inc.
Franklin Park, Ill.

[54] ELECTRONICALLY TUNED ANTENNA SYSTEM
4 Claims, 3 Drawing Figs.

[52] U.S. Cl. .......... 325/383, 325/454
[51] Int. Cl. .......... H04b 1/18
[50] Field of Search .......... 325/383, 454, 385; 343/745, 746, 747, 748

[56] References Cited
UNITED STATES PATENTS
2,206,820 7/1940 Mydlil .......... 250/33
3,035,170 5/1962 Webster .......... 250/20
3,209,358 9/1965 Felsenheld .......... 343/745

*Primary Examiner*—Robert L. Griffin
*Assistant Examiner*—Kenneth W. Weinstein
*Attorney*—Muller & Aichele

ABSTRACT: A tank circuit for the aerial of a radio receiver includes a transformer located in a housing positioned at the bottom of the aerial with the primary winding electrically connected to the aerial. A voltage variable capacitor is connected across the primary winding. The secondary winding of the transformer is connected by a coaxial cable to the radio receiver which is remotely positioned from the aerial. A direct current potential from a potentiometer in the radio receiver is coupled through the coaxial cable to the voltage variable capacitor for tuning the antenna tank circuit over a predetermined frequency band. The selected RF signal in turn is coupled from the secondary winding of the transformer through the coaxial cable to the radio receiver.

PATENTED MAR 23 1971 3,571,716

INVENTORS.
FRED P. HILL
RICHARD T. RACE

BY Mueller, Aichele & Rauner
ATTORNEYS.

ELECTRONICALLY TUNED ANTENNA SYSTEM

BACKGROUND OF THE INVENTION

It is common knowledge that antennas for vehicular radio broadcast receivers are electrically inefficient. The principal reason for this inefficiency is the relatively short length of the antenna as compared to the wavelength of the frequencies which it receives. Therefore, the induced signal for a given field strength is minimal. The small signal generated in the antenna is further attenuated by a voltage divider formed by the antenna and the cable leading to the radio receiver. The extremely low (20 pf) capacity of the antenna is shunted by the relatively high capacity (approximately 150 pf) of the antenna cable, resulting in high signal attenuation.

It has been proposed to electronically tune an antenna by placing a voltage variable capacitor across the entire antenna. Although this permits electronically changing the antenna size for any given incoming signal so that the antenna acts as a more efficient voltage generator, this does not solve the problem of the high capacity of the cable coupling the antenna to the radio receiver shunting the low capacity antenna resulting in excessive signal attenuation.

SUMMARY

It is an object of this invention to provide an antenna system for a radio receiver that provides a high gain signal to the receiver remotely positioned from the receiver aerial.

In one embodiment of this invention an antenna system for a vehicle includes an aerial remotely positioned from the radio receiver. A transformer is located at the base of the aerial and the primary winding thereof is electrically connected to the aerial. A voltage variable capacitor is connected across the primary winding to form an antenna tank circuit. A coaxial cable connects the secondary winding of the transformer to the remotely located radio receiver. A potentiometer located at the radio receiver provides a variable DC potential through the coaxial cable to the voltage variable capacitor for tuning the antenna tank circuit over a predetermined frequency range. The selected radio frequency signal in turn is coupled from the tank circuit by the secondary winding of the transformer through the coaxial cable to the radio receiver. By locating the antenna tank circuit at the base of the aerial, the capacitance of the cable connecting the aerial to the radio receiver is across the low impedance secondary winding of the transformer, resulting in negligible attenuation of the incoming radio frequency signal by the antenna system. In a further modification of the system, the first radio frequency amplifier stage of the radio receiver is also located at the aerial base with the tuned tank circuit, and the amplified RF signal is coupled to the remaining signal processing stages of the receiver.

DETAILED DESCRIPTION

Figures 1, 2:
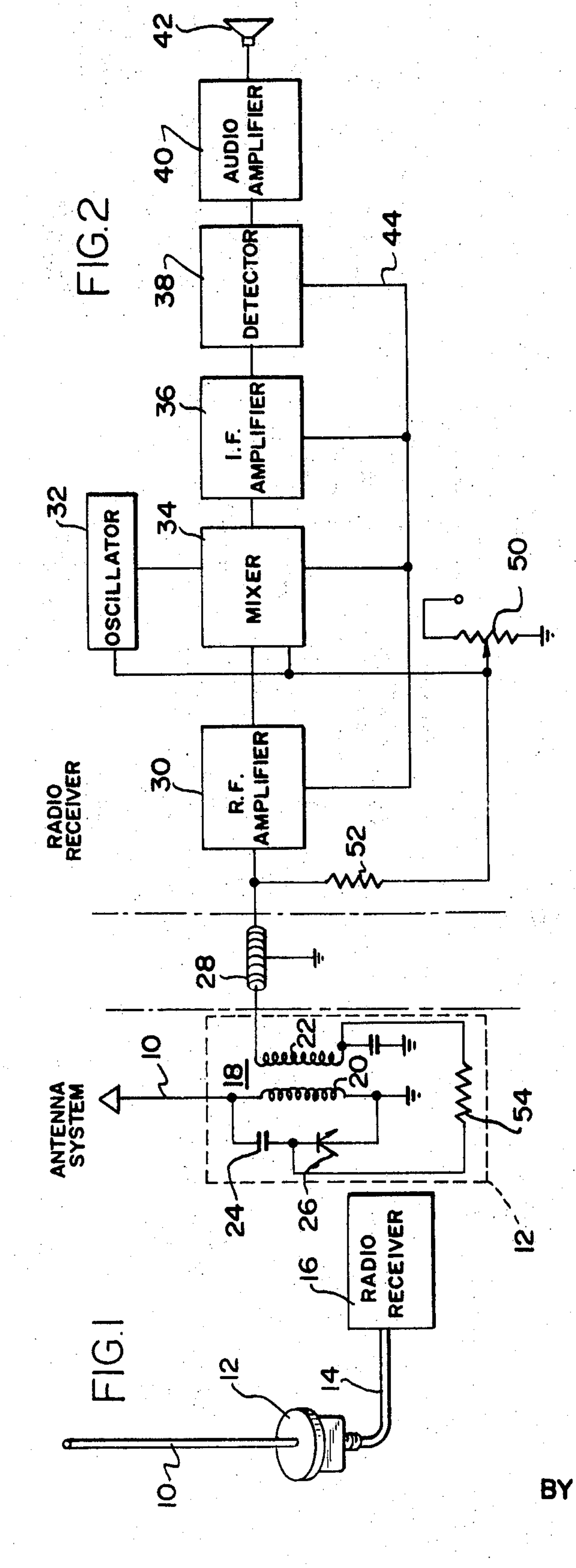
FIG. 1 is a block diagram of the antenna system in accordance with this invention.
FIG. 2 is a schematic wiring diagram partially in block form illustrating an antenna system in accordance with this invention.

Referring to the FIGS. of the drawing, FIG. 1 illustrates a conventional automobile antenna or aerial 10 which is on the order of 5 feet in length. A housing or pot 12 is attached to the base of aerial 10. The housing 12 holds the electronic components of the antenna system. A coaxial cable 14 electrically connects the aerial 10 and housing 12 to the radio receiver 16 which is remotely located from the antenna system.

As shown in FIG. 2, positioned at the bottom of aerial 10 and within the housing 12 is a transformer 18 which has a primary winding 20 and a secondary winding 22. Primary winding 20 is electrically connected to the base of aerial 10. Also connected to the aerial 10 and across the primary winding 20 is a blocking capacitor 24 and a voltage variable capacitor or reactance device 26. The voltage variable capacitor 26 and primary winding 20 of transformer 18 form a tank circuit for tuning the aerial 10 through a predetermined radio frequency range.

A voltage variable capacitor is a two-terminal, PN junction semiconductor device which exhibits a change in capacitance proportional to a change in direct current bias across the device.

The selected radio frequency signal is coupled by the low impedance secondary winding 22 of transformer 18 through a conductor or coaxial cable 28 to the radio receiver which is located in the automobile remote from the aerial itself. The radio receiver includes a radio frequency amplifier 30, which amplifies the signal from the aerial 10. The radio frequency signals are heterodyned in a converter comprising a local oscillator 32 and mixer 34. The resultant intermediate frequency signals are amplified in the IF amplifier 36, detected in detector stage 38 and coupled to audio amplifier 40, which drives the speaker 42. A circuit shown generally at 44 provides automatic gain control for the RF amplifier 30, the mixer 34 and IF amplifier 36 in the conventional manner by sampling the gain of the signal in the detector stage.

In addition to using a voltage variable capacitor device for tuning the antenna system, the radio receiver utilizes similar devices for tuning other tuned circuits in the receiver such as the oscillator 32. These voltage variable capacitor devices for tuning provide many advantages over the conventional mechanical tuners such as cost, size and reliability. The potentiometer 50, which can be located at the radio receiver or other locations in the automobile such as rear seat arm rests, provides a direct current potential for tuning the voltage variable capacitors in the radio receiver. In addition, the direct current potential is coupled across resistor 52 and through coaxial cable 28, secondary winding 22 of transformer 18 and resistor 54 to the voltage variable capacitor 26. Therefore, the potentiometer 50 not only tunes the radio receiver to the desired radio frequency signal, but simultaneously tunes the antenna system of the radio receiver to the desired radio frequency. The unique concept of placing the antenna tank circuit at the base of aerial 10 has provided gratifying results in the signal gain obtained at the RF amplifier 30 from aerial 10. By positioning the transformer 18 at the base of aerial 10 and tuning the antenna tank circuit with the voltage variable capacitor 26, we have in effect placed the rather large capacitance of coaxial cable 28 across the low impedance secondary winding 22 of the transformer 18 so that there is negligible signal attenuation between the aerial 10 and the RF amplifier 30. Furthermore, the simplexing of the direct current bias potential for the voltage variable capacitor 26 and the RF signal from the secondary winding 22 of transformer 18 to the RF amplifier 30 through the coaxial cable 28 permits the use of a single cable such as is used today in conventional automobile radios.

Figure 3:
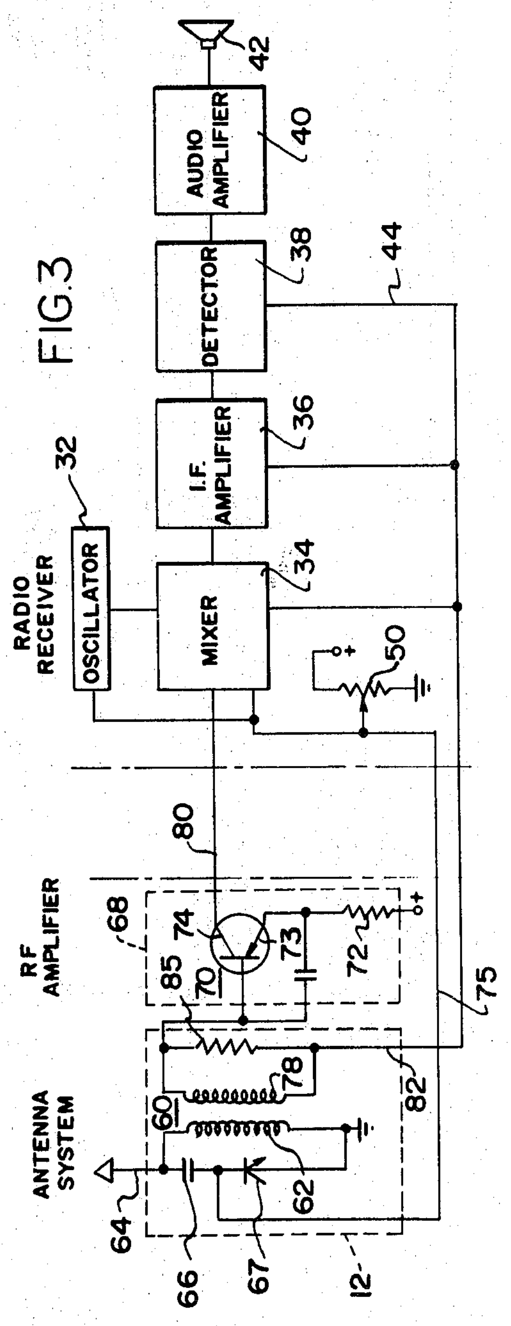
FIG. 3 is a schematic wiring diagram partially in block form illustrating a second embodiment of the antenna system of FIG. 2.

FIG. 3 illustrates another embodiment of the invention, and elements in FIG. 3 that are similar to those in FIG. 2 are given like numbers. Like the embodiment of FIG. 2, a transformer 60 is located in the housing 12. The transformer has a primary winding 62 that is electrically connected to the base of aerial 64, and fixed capacitor 66 and voltage variable capacitor 67 which are connected across primary winding 62 of the transformer 60, form a tuned tank circuit for the antenna system. In addition to the above components this embodiment also has the radio frequency amplifier stage 68 located within the housing 12 at the base of the aerial 64. The RF amplifier stage includes transistor 70, which has a direct current path therethrough including resistor 72, emitter 73 and collector 74.

In this embodiment the direct current bias potential from potentiometer 50 is connected to the voltage variable capacitor 67 through a conductor 75, and the radio frequency signal from the antenna tank circuit is coupled by secondary winding 78 of the transformer 60 to the transistor 70 of the radio frequency amplifier 68. A second conductor 80 couples the amplified RF signal to the remote receiver where it is heterodyned to an intermediate frequency amplified and detected to an audio frequency for driving the speaker 42. Automatic gain control (AGC) for the radio receiver is provided by the circuit 44, which includes a conductor 82 that extends into the housing 12 at the base of aerial 64 and which couples the AGC signal across the resistor 85 to the transistor 70 to provide for constant gain of the RF amplifier 68.

Because the radio frequency signal is received and amplified at the base of antenna 64, the capacitance of the line 80 coupling the signal from the radio frequency amplifier 68 to the remote radio receiver has little effect on the amplified radio frequency signal, resulting in negligible signal attenuation by the conductor 80.

What has been described, therefore, is a unique antenna system for a radio receiver remotely located from the receiver aerial, which provides for a high gain radio frequency signal from the antenna system to the remote radio receiver.

We claim:

1. An antenna system for wave signal apparatus, including in combination, an aerial, a housing, antenna tank circuit means positioned in said housing, said housing being mechanically connected to said aerial at the base thereof with said tank circuit means being electrically connected to said aerial, said tank circuit means including a transformer having a voltage variable reactance means connected across the primary winding thereof, circuit means connected to said voltage variable reactance means and applying a variable bias potential thereto for selectively tuning said antenna tank circuit means to a predetermined frequency and coupling means including a conductor connected to the secondary winding of said transformer for coupling signals at the predetermined frequency to the wave signal apparatus whereby the reactance of said conductor is across the secondary winding thereby providing greatly reduced attenuation of the wave signal between said aerial and the wave signal apparatus.

2. In an antenna system for a radio receiver having a plurality of signal processing stages tunable in response to an applied direct current potential over a predetermined frequency range and being remotely positioned from the receiver aerial, the combination including, an aerial, a housing mechanically connected to said aerial at the base thereof, an antenna tank circuit including a transformer located in the housing, said transformer having a primary and secondary winding, said primary winding being electrically connected to said aerial, said tank circuit further including a voltage variable capacitor coupled across said primary winding and being responsive to a direct current potential applied thereto for tuning said tank circuit to a predetermined radio frequency, and coupling means connected to said secondary winding of said transformer and coupling the selected radio frequency signal from said tank circuit to the radio receiver remotely positioned therefrom.

3. The radio receiver of claim 2 further including variable voltage means providing a direct current potential to selected signal processing stages of the radio receiver for tuning the same over the predetermined frequency range, and wherein said coupling means includes a coaxial cable, said coaxial cable coupling said direct current potential from said variable voltage means to said voltage variable capacitor so that said tank circuit is tuned to the same radio frequency as the selected signal processing stages of the radio receiver, said coaxial cable further coupling selected radio frequencies from said tank circuit to the radio receiver.

4. An antenna system for a radio receiver having a plurality of signal processing stages and a remotely located aerial, including in combination, a housing connected to the aerial, a transformer located in said housing and having a primary and secondary winding, a voltage variable capacitor coupled across said primary winding and forming a tank circuit, said tank circuit being connected to said aerial, a potentiometer providing a direct current potential, circuit means for connecting said potentiometer to said voltage variable capacitor, said potentiometer varying the bias on said voltage variable capacitor to tune said tank circuit to a predetermined radio frequency signal, a radio frequency amplifier stage positioned in said housing remote from the radio receiver, said secondary winding of said transformer coupling said signal at said predetermined frequency to said radio frequency amplifier stage, and conductor means for connecting said amplifier stage to the remaining signal processing stages of the radio receiver positioned remotely from said aerial.